Dec. 1, 1959   K. C. SCHWENGER   2,914,839
PROCESS FOR THE INTERNAL CALIBRATION OF SINGLE- OR
MULTIPLE-PART BALL GUIDE TUBES
Filed May 6, 1955
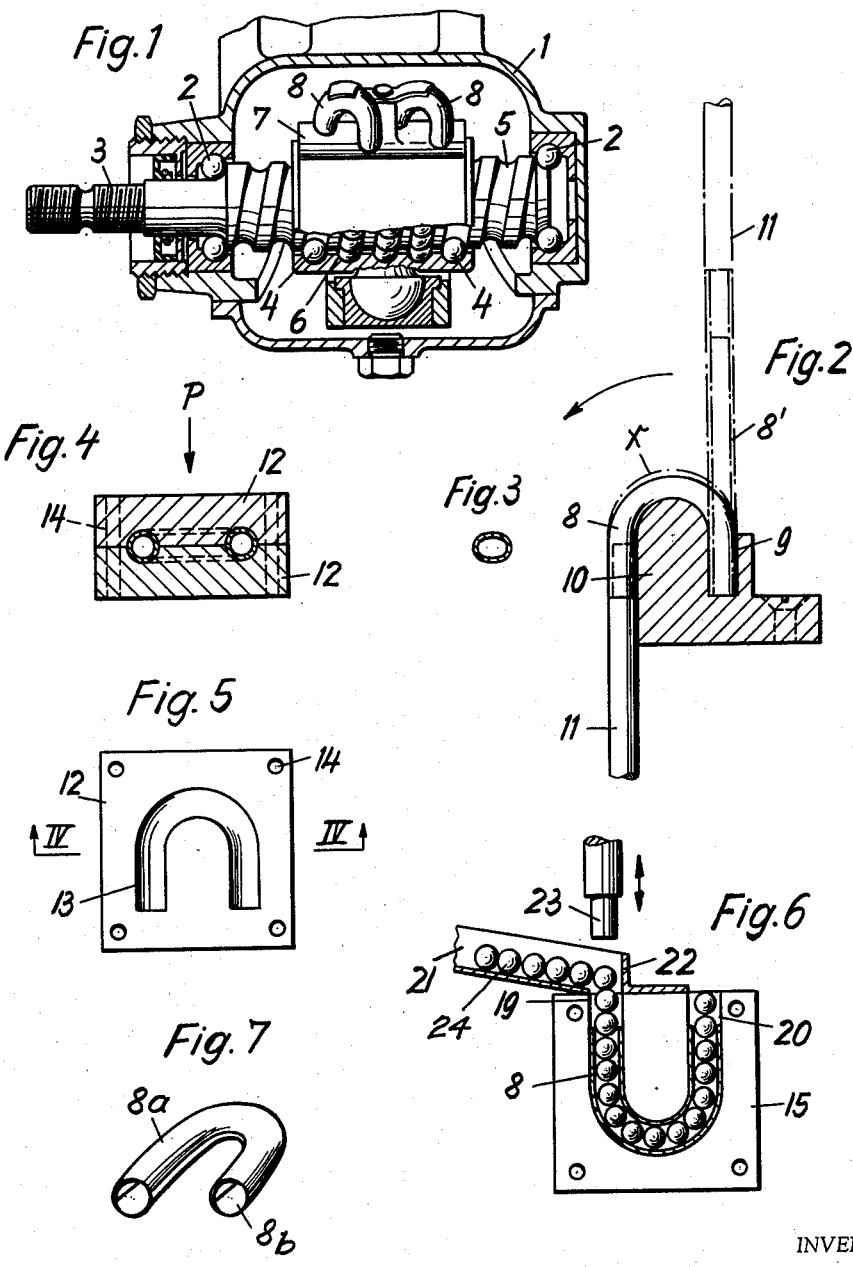
INVENTOR
KARL CHR. SCHWENGER
BY  Dicke and Craig.
ATTORNEYS

United States Patent Office 2,914,839
Patented Dec. 1, 1959

2,914,839

PROCESS FOR THE INTERNAL CALIBRATION OF SINGLE- OR MULTIPLE-PART BALL GUIDE TUBES

Karl C. Schwenger, Stuttgart-Bad Cannstatt, Germany, assignor to Daimler-Benz Aktiengesellschaft, Stuttgart-Unterturkheim, Germany Application May 6, 1955, Serial No. 506,633

5 Claims. (Cl. 29—148.4)

It is of considerable importance in steering gears in which balls are provided to reduce friction between the worm shaft and the sliding nut, that the balls should neither bind anywhere nor have excessive play. A point to be considered as particularly critical is the ball recirculating arrangement which is normally a U-shaped tube inserted with its leg ends into the ball guiding threads of the sliding nut and held therein in its operating position, as by means of screwed-on clips.

Experience has shown that a particularly small resistance in guiding the rollers is obtained if the tube curvature is of semicircular shape, in contrast to tubes having a straight central portion and two bent-on legs of smaller radius of curvature.

Accordingly, the present invention relates to a method for inside calibration of single- or multiple-part ball guide tubes bent particularly into a U or similar shape and intended particularly for the recirculation of balls in automobile steering gears.

The object of the invention is to drive balls under pressure through the tube which is simultaneously held in its shape from outside, beginning with smaller diameter balls and increasing gradually the diameter of the balls, until the balls subsequently used for service pass easily through the tube. In the case of tubes composed of two shell halves, the tubes are brought together into their service position and clamped in a hollow die. When calibrating single-part tubes, the tubes which are preferably cut to their final length are first bent over a pattern, and the cross-sectional changes that have occurred during bending are subsequently removed again by pressing the tubes in a hollow die before the balls are driven through as indicated above.

The invention is more particularly described with reference to the accompanying drawings which show an example of construction of the invention in which:

Figure 1 is a longitudinal section through an automobile steering gear;

Figure 2 is a bending pattern with ball guide tubes bent thereover for the steering gear according to Fig. 1;

Figure 3 is a cross section through the central section of the tube according to Fig. 2;

Figure 4 is a cross section through a tubular loop placed between two open dies, as taken on the line IV—IV in Fig. 5;

Figure 5 is an interior view of a single open die;

Figure 6 is a calibrating ball driving device; and

Figure 7 is a diagrammatic view of a tube composed of two shell halves.

Referring to the example of construction shown in Fig. 1, the worm spindle 3 carried between two thrust ball bearings 2, 2 in the steering gear housing 1 engages two independent rows of balls 4, 4 rolling, on the one hand, in the threads 5 of the worm spindle 3 and on the other, in corresponding threads 6 of the sliding nut 7. The balls of each row are returned in known manner from the end of engagement to the beginning thereof through a recirculating tube 8, 8.

As shown in Fig. 2, the ball recirculating guides 8 consist of a tubular loop comprised of a preferably semi-circularly curved central section ending in two straight, particularly parallel legs.

The U-shape is produced, for instance, by inserting the straight tube 8′ which has been cut off to its final length, for instance into the retaining hole 9 of a bending pattern 10 and bending the tube 8′ into the U-shape represented in Fig. 2 by means of a rod 11 inserted therein, pliers inserted thereon or the like, for instance by hand or, if practicable, mechanically, for instance by means of an eccentric press, or a suitably controlled die or roller. As the tube is being bent, a flat X is formed on the external radius of the bend, i.e., the cross section of the tube at that point assumes an undesirable oval form (Fig. 3) which must be removed again to ensure unhampered passage of the balls. This is achieved by means of the open dies 12, 12 (Figs. 4 and 5), the working faces of which are each provided with a mutually symmetrical U-shaped recess 13 (Fig. 5). The U-shape of these recesses corresponds exactly to the shape of the finished ball guide tube, and their mutually complementary semicylindrical cross sections when brought together give a cylindrical cross section which corresponds to the external diameter of the finished ball guide tube 8. The corner holes 14 also provided in the open dies 12 serve the arrangement and engagement of dowel pins to enable the two dies 12, 12 to be placed on each other quickly, accurately and without effort. For the further processing of the U-shaped tubes removed from the bending pattern 10, the tubes are placed between the two dies 12, 12, a pressure P is applied to the latter, for instance by the ram of a press, and the tube section is thereby restored to its cylindrical shape. Finally, the ball passage of the U-shaped tube is calibrated. To this end, the tube 8 is again placed between two open dies 15 supporting its shape (Fig. 6) and the U-shaped recesses of which are accessible from the outside through two drilled holes 19 and 20 which are in line with the leg ends of the U-shape. An inclined chute 21 provided with an end stop 22 ends adjacent to the drilled hole 19 which serves as filler hole. Moreover, a ram 23 is arranged to move above the filler hole 19. To calibrate the tube bore, balls 24 are allowed to roll into the hole 19 under the ram 23 which forces them into the hollow of the dies 15 and through the tube 8 placed therein, said balls being first of a smaller and then of a progressively larger diameter. The calibrating process and, consequently, machining of the tube is completed the moment the balls designed for operation of the worm spindle roll easily through the tube 8. It can then be assembled to the sliding nut 7 of the steering gear and fastened thereto in any desired manner.

It is of advantage in duplicate production if two different pairs of dies 12 and 15, respectively, are used for the pressing operation according to Fig. 4 and the calibrating process according to Fig. 6, and if each pair of dies is left in the appropriate machine (die and ram press, respectively). However, it is also possible according to the invention to provide to two open dies 12 with outwardly directed drilled holes according to the pattern of the dies shown in Fig. 6, and to use the dies 12 also for holding the U-shaped tube when driving through the balls. The shape of the tube according to the invention does not necessarily have to be that of a U, although in my opinion this is the best solution. However, the tube may alternately be bent into a flatter or more pointed shape. Also, the leg ends of the tube may alternately be curved to a greater or less degree.

The ball calibrating process as mentioned before is also suited for tubes composed of two shell halves, as shown for instance in Fig. 7. The two shell halves 8a and 8b which have been previously pressed into shape, are placed upon each other in known manner and laid in the dies 15 as an integral U-shaped tubular loop (Fig. 6), when calibration can be made as explained above with reference to said figure. The separating lines according to the invention may alternatively be located differently from the arrangement shown in Fig. 7, for instance, staggered for 90°.

I claim:

1. A process for the manufacture and internal calibration of a multiple-part ball guide tube of relatively small cross section and made of highly resistant material, such as steel, bent particularly into a U or similar shape with a relatively small radius of curvature and intended particularly for use as a ball recirculating device in automobile steering gears, comprising the steps of providing two complementary shell halves formed by pressing or the like and placing the same together to give a closed, bent tubular shape, thereupon driving calibrating balls of an at first smaller and then progressively increased diameter under pressure through said tube while simultaneously holding said tube in its shape from outside, until balls of such size as will be used later for service will roll therethrough easily.

2. A process for the manufacture and internal calibration of single-part ball guide tubes bent particularly into a U or similar shape and preferably intended for use as ball recirculating devices in automobile steering gears, characterized in that the straight tube cut to size is inserted into a blind hole adjacent to a pattern provided with a U-shaped groove or onto a retaining pin adjacent to said pattern, that a stem provided with a handle is next inserted into or onto the free end of said tube, which is then bent around said pattern either manually or mechanically, whereupon said tube is placed in a suitable hollow shape of a two-part supporting device so that the two ends of said tube in said hollow shape are outwardly exposed, whereupon calibrating balls of an initially smaller and then gradually increased diameter are driven through said tube by means of a press ram provided with a ball feeding device until balls of such size as will be subsequently used for service will roll therethrough easily.

3. A process for the internal calibration of a multiple ball guide tube of highly resistant material such as steel and bent into a U-shape with a relatively small radius of curvature and intended for use as a circulating device in automobile steering gears, comprising the steps of rolling calibrated balls of an initially smaller and gradually increased diameter from a first position spaced from said tube to a second position adjacent said tube, applying driving pressure to and driving the balls through the U-shaped tube while simultaneously maintaining the shape of the tube from without and enlarging by deforming the inside diameter of said tube until the last larger balls are of essentially the same diameter as those which will be subsequently used for service, said last larger balls rolling easily through said tube.

4. A process for the internal calibration of a single- or multiple-part ball guide tube of highly resistant material, bent particularly into a U or similar shape with a relatively small radius of curvature and intended primarily for use as a ball recirculating device in automobile steering gears, comprising the step of enclosing the U-shaped tube by a pair of dies having a U-shaped passage receiving the tube, and further comprising the step of enlarging by deforming the inside diameter of said U-shaped tube solely by driving calibrating balls of an internally smaller and progressively increased diameter through the U-shaped tube until the last larger balls are of essentially the same diameter as those which will be used subsequently for service, said last larger balls rolling easily through said tube.

5. A process for the manufacture and internal calibration of a single-part ball guide tube of relatively small cross section and made of highly resistant material bent particularly into a U or similar shape with a relatively small radius of curvature and intended particularly for use as a ball recirculating device in automobile steering gears, comprising the steps of bending a straight tube over a pattern and intermediate its ends into the shape of a U, enclosing the U-shaped tube by a pair of dies having a U-shaped passage receiving the tube, and comprising the further step of enlarging by deforming the inside diameter of said U-shaped tube until the last larger balls are of essentially the same diameter as those which will be subsequently used for service, said last larger balls rolling easily through said tube.

References Cited in the file of this patent

UNITED STATES PATENTS

| | | |
|---|---|---|
| 1,402,508 | Lothrop | Jan. 3, 1922 |
| 1,429,924 | Brinkman | Sept. 26, 1922 |
| 1,466,953 | Loomis | Sept. 4, 1923 |
| 1,469,793 | Johnson | Oct. 9, 1923 |
| 1,845,122 | Briney | Feb. 16, 1932 |
| 1,883,692 | Gillin | Oct. 18, 1932 |
| 2,041,199 | Miller | May 19, 1936 |
| 2,345,443 | Aiken | Mar. 28, 1944 |
| 2,545,878 | Forrest | Mar. 20, 1951 |